Dec. 18, 1934.          S. H. WINSTON          1,984,448
RIMLESS EYEGLASSES AND SPECTACLES
Filed Jan. 31, 1934
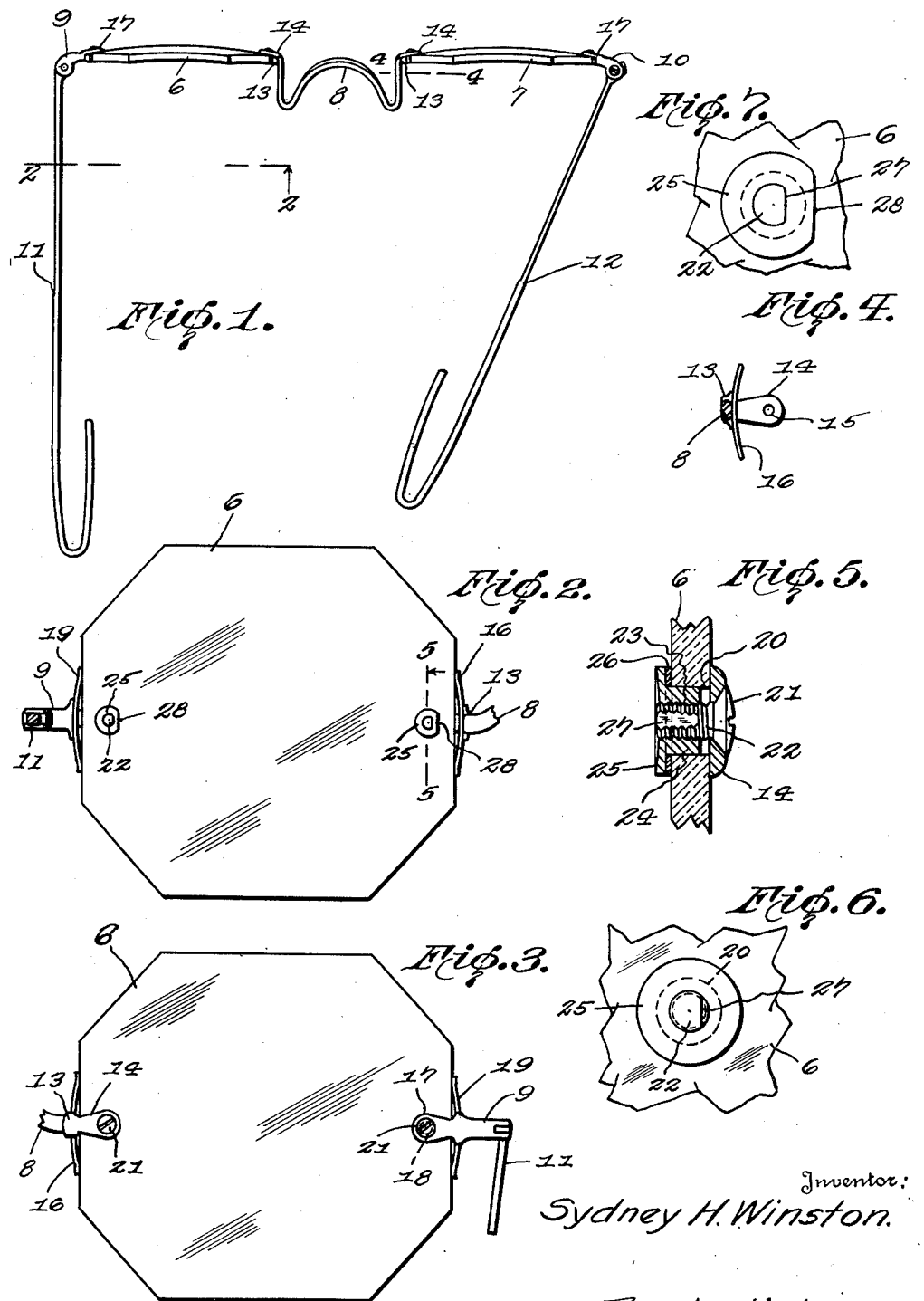
Inventor:
Sydney H. Winston.
By F. V. Winters.
Attorney Patented Dec. 18, 1934

1,984,448

UNITED STATES PATENT OFFICE 1,984,448

RIMLESS EYGLASSES AND SPECTACLES

Sydney H. Winston, South Ozone Park, N. Y.

Application January 31, 1934, Serial No. 709,205

3 Claims. (Cl. 88—47)

The subject-matter of the present invention relates generally to eyeglasses and spectacles, and the improvements are directed to a novel form of ophthalmic mounting.

Primarily, the object of the present invention is to provide a lens mounting whereby the end pieces forming a part of the usual bridge or temples may be affixed to the lenses with greater ease and accuracy and wherein no special skill is necessary in assembling the aforesaid parts in proper relation.

Another object is to provide a mounting wherein the usual rigid shoe is supplanted by a resilient arcuately-shaped spring member to permit accurate aligning between the apertures in the strap of said mounting and the lens itself.

Still another object of the invention is to provide means whereby the usual obstruction to the view of the wearer of eyeglasses, due to the ordinary usual of a pair of spaced straps, is reduced to a minimum.

A further object is to provide a lens mounting applicable to both the nose-piece or bridge, and the end-pieces supporting the temples, whereby said essential parts are securely affixed to the lenses, yet the connection is such that a certain degree of flexibility obtains to withstand shocks or strains.

A further aim of the invention resides in the provision of means for securing the end pieces to the lenses, whereby the fastening means does not bind to the lenses, nor come in actual contact therewith. Said securing means being fashioned to substantially assure a locking engagement for preventing the unloosening of said means.

With these objects in view, together with others which will appear as the description proceeds, the invention resides in the novel formation, combination and arrangement of parts, all as will be described more fully hereinafter, illustrated in the drawing, and particularly pointed out in the claims.

In said drawing:

Figure 1 is a plan of eyeglasses of the rimless type, constructed in accordance with my invention.

Fig. 2 is a sectional elevation, slightly enlarged, of one of the lenses and its mountings, as viewed substantially on the line 2—2 of Fig. 1.

Fig. 3 is a similar view but showing the opposite side of Fig. 2.

Fig. 4 is a sectional view, slightly enlarged and taken on the line 4—4 of Fig. 1, the lens being removed.

Fig. 5 is an enlarged sectional view taken on the line 5—5 of Fig. 2, showing certain fastening means.

Fig. 6 is a fragmentary view showing the nut associated with the fastening means in plan.

Fig. 7 is a view like unto Fig. 6, but showing the head portion of the nut pressed-in to contact the flattened portion of the screw.

Referring now more in detail to the accompanying drawing, wherein like characters of reference denote similar parts throughout the several views, let 6 and 7 indicate the lenses of the eyeglasses shown in Fig. 1, said lenses being connected by the bridge or nose-piece 8, as shown, whilst the outer portions of said lenses are connected to end pieces 9 and 10 respectively, which hingedly connect with temples 11 and 12, respectively.

Said bridge 8 is formed to coincide with the nose of the wearer and in some instances this element may be provided with nose pads. Hence, it is to be understood that the particular showing of the bridge 8 is simply one of the embodiments of the invention. As shown in Figs. 2 to 4, inclusive, the lateral arms of said bridge 8 is provided each with enlargements 13, from each of which extends a strap 14 having an aperture 15, whilst an arcuately shaped spring member 16 is suitably fastened to said enlargement. It will be understood that the aforesaid description applies to both ends of said bridge 8 at the region of its connection to both lenses 6 and 7. The end pieces 9 and 10 are similar in construction, each being provided with a strap 17 having an aperture 18, shown in dotted lines in Fig. 3, and each being also provided with arcuately shaped spring member 19 similar in construction to said members 16.

From the foregoing it will be seen that my mountings differ from those at present on the market by the omission of one strap and the rigid arcuate shoes which contact the edge of the rims. In view of this arrangement there is less obstruction to the view of the wearer of the glasses and at the same time I secure a suitable contact with the lenses with a certain amount of resiliency which tends to absorb shocks and strains to which the lenses may be ordinarily subjected. Furthermore, no extraordinary skill is required in assembling the several parts, as will appear hereinafter.

The novel and unique fastening means, referred to hereinbefore, is clearly shown in Figs. 5 and 7, and this form is typical of all connections with the lenses and hence a single description of the parts will suffice for all. Each of the lenses is provided with an aperture adjacent the inner and outer edges thereof, said aperture being denoted by the numeral 20 in Fig. 5, wherein it will be noted that said aperture is larger in diameter than the screw 21, that is, the shank portion 22 thereof, which is passed concentrically through said aperture to engage within the threaded bore 23 of nut 24 having a head portion 25. It will be noted that the diameter of said nut 24 corresponds to the diameter of the aperture in said lens, but terminates short of one face of said lens, as shown in Fig. 5, whilst a resilient washer or annular element 26 fits between the lens and the inner face of head 25 of said nut 24. It will be seen that one of the straps 14 contacts the lens surrounding the aperture 20 in the lens and when the screw 21 is passed through the bore 23, the parts are drawn together to fasten the lens to the mounting, the washer 26 being interposed between said lens and the head 25 to prevent contact of the metal with the lens. As shown in Figs. 5 and 6, screw 21 is provided with a flattened region 27 which is contacted by pressing in the head portion 25 as indicated at 28 in Fig. 7. In view of this arrangement the pressed-in head portion prevents positively the loosening of the screw in said nut. Said head portion will be composed of relatively soft material to permit the aforesaid pressed-in condition. It will also be noted that the shank portion of said screw 21 does not contact the glass composing the lenses.

Those skilled in the art to which this invention appertains are aware that ordinary ophthalmic mountings are provided with a pair of spaced straps which fit over the opposite faces of a lens adjacent the end thereof and that said mounts are provided with rigid shoes which extend in opposite directions from the mounting and which contact the rim of the lens. The aforesaid straps are provided with apertures and the lenses themselves are bored to present an opening that is supposed to align with the apertures in said straps. Actual practice and experience has taught that it is rare that the aforesaid apertures and openings will accurately align and it is the practice to effect further adjustments, that is, bending the rigid shoes, or similar operations, which ofttimes entails breakage, loss of time and other serious drawbacks. It is obvious that my idea of providing spring members to take the place of the rigid shoes compensates for any lack of alignment in the respective apertures of the strap and lens and since I adopt but a single strap for each mounting the usual adjustment such as the spreading of the ordinary spaced pair of straps to accommodate the varying thicknesses of lenses, is obviated.

In affixing my mountings it is only necessary to slide the strap along the face of the lens until the aperture in said strap is aligned with the opening in the lens, said spring members obviously permitting this operation in view of their inherent resiliency. The screw 21 is then applied to the nut 24, which has been inserted in the aperture in the lens, and the parts are suitably affixed. Manifestly, the spring members are flexed and after the parts are applied the connection is flexible, yet sufficiently rigid.

From the foregoing it will be seen that my single strap arrangement does not require careful adjustment to the lenses and the provision of spring members assures quick connection of the parts and the lack of usual adjustment and its attendant breakage of lenses.

It is to be understood that while the drawing shows one form of lenses, my improved mountings are applicable to all sizes and shapes, either flat or toric.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. An ophthalmic mounting comprising a strap having an aperture and adapted to be positioned on one side of an apertured lens, an internally threaded nut having a shank portion fitting into the aperture in said lens, said nut having a head portion composed of soft metal, so that one side thereof can be pressed in, a resilient annular member positioned between said head portion and the lens and a screw engaging said strap and nut to secure said mounting to said lens, said screw having a flattened region engaged by the pressed in side of said head portion to affix said mounting to said lens.

2. An ophthalmic mounting comprising a strap having an aperture and adapted to be positioned on one side of a lens having an opening, a flexible member carried by said mounting and having oppositely extending spring arms adapted to contact the edge of the lens and to flex to align the aperture in said strap with the opening in said lens, a nut having a shank portion fitting into the aperture of said lens, said nut having a head portion composed of soft metal, so that one side thereof can be pressed in, an annular member positioned between said head portion and the lens and fastening means engaging said strap and nut, said fastening means including a flattened region engaged by the pressed in side of said head portion to affix said mounting to said lens.

3. An ophthalmic mounting comprising a strap having an aperture and adapted to be positioned on one side of an apertured lens, a nut having a shank portion fitting into the aperture in said lens and including a head portion composed of compressible material so that one side thereof can be pressed in, said nut having an opening therethrough, and fastening means engaging said strap and extending into the opening of said nut, said fastening means having a flattened region engaged by the pressed in side of said head portion whereby said mounting is affixed to said lens.

SYDNEY H. WINSTON.